United States Patent [19]

Hale

[11] Patent Number: 4,852,792

[45] Date of Patent: Aug. 1, 1989

[54] SELF LOCKING COVER/BOTTOM FOR FIBRE DRUMS

[75] Inventor: James A. Hale, Red Bank, N.J.

[73] Assignee: Greif Bros. Corporation, Delaware, Ohio

[21] Appl. No.: 163,064

[22] Filed: Mar. 2, 1988

[51] Int. Cl.⁴ ............................................. B65D 3/12
[52] U.S. Cl. .................................. 229/5.5; 206/598; 220/306; 220/359; 229/125.28
[58] Field of Search .................. 229/4.5, 5.5, 125.28; 220/67, 359, 306; 206/598, 599

[56] References Cited

U.S. PATENT DOCUMENTS

| | | | |
|---|---|---|---|
| 2,703,645 | 3/1955 | Scrimshaw | 206/598 |
| 2,736,485 | 2/1956 | Rabby | 229/125.28 |
| 2,753,088 | 7/1956 | Prahl, Jr. | 220/67 |
| 3,190,537 | 6/1965 | Meineoke et al. | 229/5.5 |
| 3,219,252 | 11/1965 | Fleming et al. | 206/598 |
| 3,851,812 | 12/1974 | Bittel | 229/5.5 |
| 3,910,448 | 10/1975 | Evans et al. | 220/359 |
| 3,968,823 | 7/1976 | Simon | 220/359 |
| 4,046,282 | 9/1977 | Ruch | 220/306 |
| 4,183,457 | 1/1980 | Loughley et al. | 229/5.5 |
| 4,201,306 | 5/1980 | Dubois et al. | 220/67 |
| 4,241,864 | 12/1980 | Kessler | 229/5.5 |
| 4,355,759 | 10/1982 | Amberg | 229/5.5 |
| 4,380,447 | 4/1983 | Vanderlugt, Jr. | 229/5.5 |
| 4,431,113 | 2/1984 | Sims, Jr. | 220/306 |
| 4,585,138 | 4/1986 | Jonkers | 220/67 |

FOREIGN PATENT DOCUMENTS

| | | | |
|---|---|---|---|
| 2411495 | 9/1974 | Fed. Rep. of Germany | 229/125.28 |
| 793005 | 4/1958 | United Kingdom | 220/67 |
| 1178870 | 1/1970 | United Kingdom | 220/67 |

Primary Examiner—Gary Elkins
Attorney, Agent, or Firm—Kane, Dalsimer, Sullivan, Kurucz, Levy, Eisele and Richard

[57] ABSTRACT

A self locking cover/bottom for a fibre drum includes substantially perpendicular projections with inwardly tapered portions which, when in registry with notched portions in the fibre shell sidewall, engage the notched portions (which can bend inwardly) such that an airtight seal can be formed for the drum. An optional feature is the provision of a channel in the bottom to accommodate a tine of a fork lift truck.

6 Claims, 3 Drawing Sheets

FIG. 12
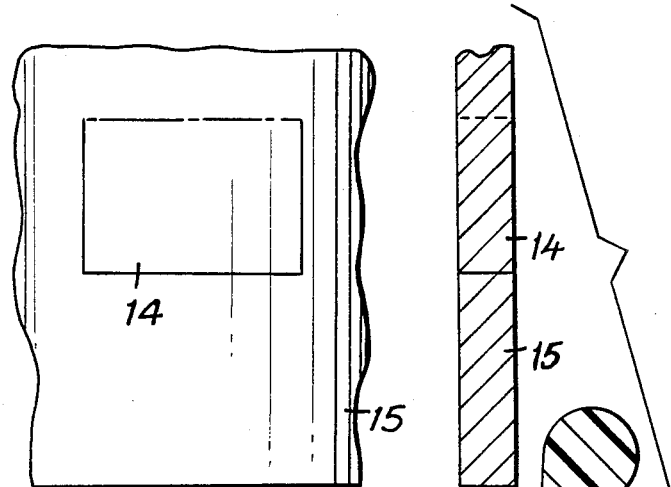
FIG. 11
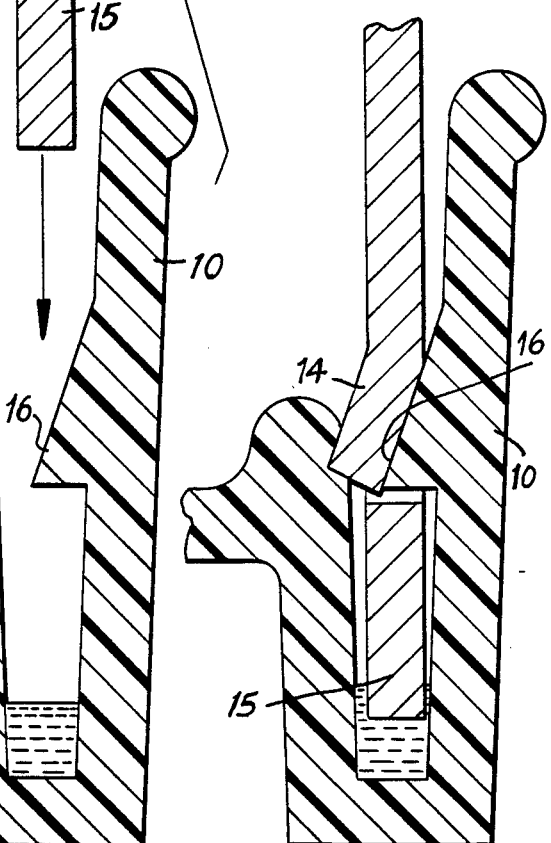
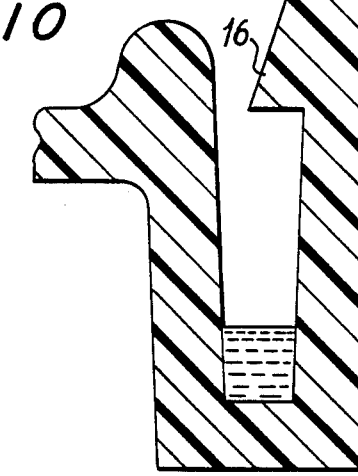
FIG. 9
FIG. 10

SELF LOCKING COVER/BOTTOM FOR FIBRE DRUMS

BACKGROUND OF THE INVENTION

1. Field of the Invention

The invention relates to a self locking cover/bottom for fibre drums which can be of various and variable cross sectional area, such as round or rectangular drums.

2. Description of the Prior Art

U.S. Pat. No. 4,485,924 discloses a square stackable and palletizable drum wherein the drum lid 2 has a channel 3 immediately inside of its border 1 for collecting rain water or other liquid which may fall on the drum and holes 8 in its outer wall through which the liquid may drain off. As explained in the last full paragraph of column 2, a seal basin is formed and a stopper 13 is screwed into the box 9, which has an airtight joint 11. Finally, another lid 5 is put into place and is then flanged throughout its parameter 16, creating a completely enclosed pan sealed and raised to prevent any foreign body entering, achieving absolute air tightness.

References which are somewhat relevant to a feature of the present invention wherein a drum bottom has channels for fork lifts include U.S. Pat. No. 3,942,670 wherein drum shaped containers have inverted U-shaped channels extending diametrically through the bottom surface thereof and in which the drums can be arranged in pairs or fours by a retainer strap such that the channels may be engaged by the lifting forks of a fork lift truck, and U.S. Pat. No. 4,416,374, which discloses a container for handling and storage of bulk materials such as food products with channels formed in the bottom to permit the use of a fork lift truck for moving, lifting and stacking of the container.

SUMMARY OF THE INVENTION

The invention relates to self locking plastic or metal covers which may be placed on fibre drums of various configurations such as the Economy Round ® or rectangular RO-CON ® drums manufactured by the Greif Bros. Corporation at their many plants throughout the United States.

The covers are intended to be shipped in a "non-locking" configuration from the manufacturer to the customer. The customer then lifts off the self locking covers by pulling them off of the fibre drum shell. When the drum shell is filled the cover is placed over the open end of the fibre shell. The circumference of the end portion of the fibre shell has notches punched in it, in a suitable pattern around the shell to secure the cover to the fibre drum shell itself. The cover itself has molded, tapered inwardly portions which may be made by a plastic injection process or "die formed" to engage the fibre shell when the projections of the cover are aligned so as to fit into the notched portions of the shell. When the cover is used as a bottom, it is also secured by a hot melt adhesive or other suitable adhesive applied around its complete 360° channel to fuse it to the fibre shell. The locking projections nd notches hold the bottom in place while the appropriate adhesive "sets up".

As is clear from the above, the cover/bottom only locks on the drum shell when the projections of the cover/bottom and the notches are in proper registration.

A unique feature of the present invention is the locking tab arrangement wherein projections on the cover or bottom project inwardly into the circumference of the fibre shell in such a way so as to reinforce the fibre shell and make it relatively impossible for the shell to move away from the locking tab in the plastic cover. This arrangement makes for a much more secure mechanism than if the projections of the cover/bottom just barely goes over the shell and does not project inwardly enough to cause this reinforcement to the locking system.

Another important feature of the invention applies when it is used as a bottom. In this embodiment a specially molded bottom is made which incorporates a channel across the bottom to provide a "fork" entry to slide under stack drums so that they may be lifted and transported without the need of using pallets. An important advantage of this feature is that two drums placed side by side can be lifted simultaneously by locating the two tines on a fork lift truck to match the channel spacing.

BRIEF DESCRIPTION OF THE DRAWINGS

FIG. 9 shows an elevational view of the notched and perforated sidewall of the present invention.

FIGS. 10 and 11 respectively show a bottom projection withdrawn from a corresponding notch in the fibre shell and a bottom projection bent so as to fit into a corresponding notch in the fibre shell when the cover/bottom is in a locked position.

FIG. 12 shows a recess which Can be optionally built into the bottom of the present invention to facilitate lifting by fork lift trucks.

DESCRIPTION OF THE PREFERRED EMBODIMENTS

Figure 1:
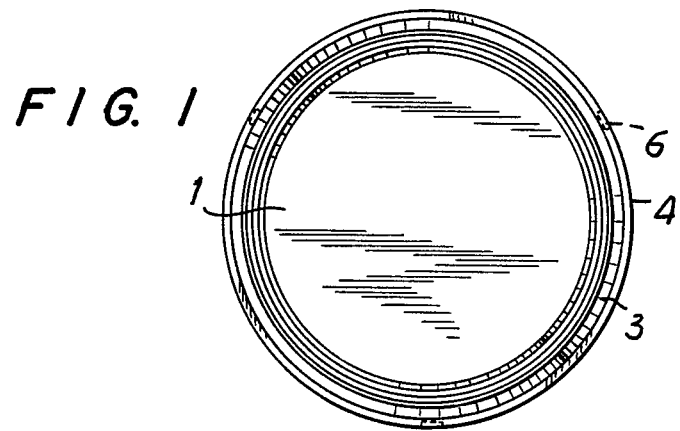
FIG. 1 is an elevational view showing the interior details of the cover/bottom of the present invention.
Figure 2:
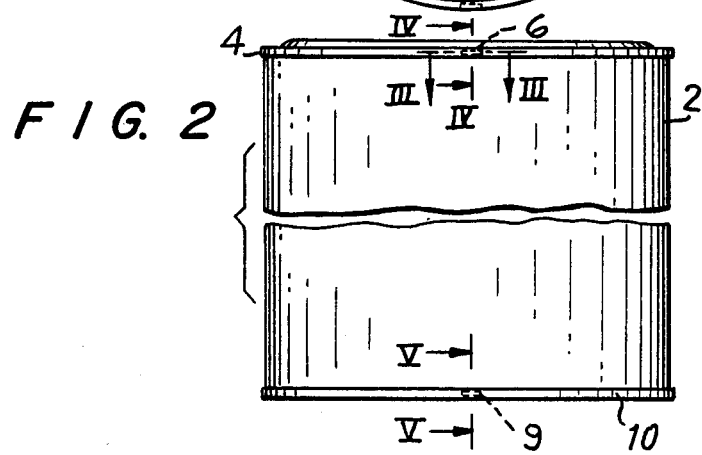
FIG. 2 is an elevational view of the fibre drum which can be used with the cover/bottom of the present invention.
Figure 3:
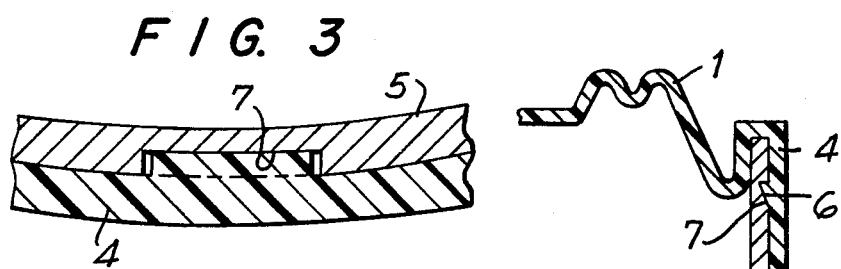
FIG. 3 is a partial top view of the drum of FIG. 2 taken along the lines III—III.
Figure 4:
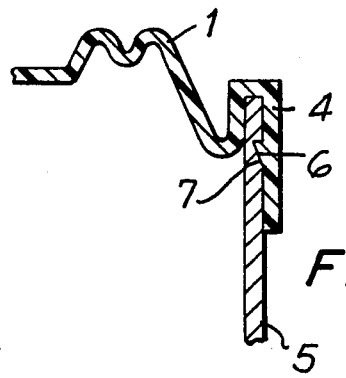
FIG. 4 is a sectional view of the drum top of FIG. 2 taken along the lines IV—IV.

FIG. 1 shows a cover according to the present invention with a 360° channel 3 which facilitates the securing to the fibre shell 2. When the cover is used as a bottom, it is secured by means of a hot melt adhesive or other suitable adhesive. The cover 1 has downwardly extending projections 4 which in turn have flexible sections 6 which fit into notches 7 of the side wall 5 of fibre shell 2 as best shown in FIGS. 3 and 4 when the cover is in locked position.

Figure 5:
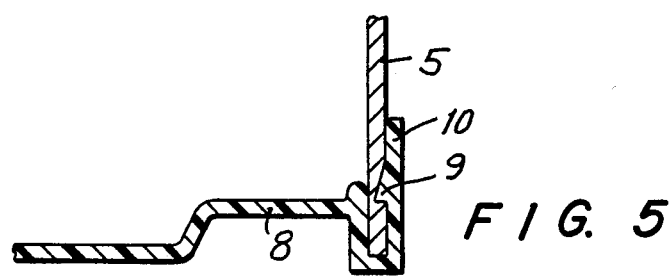
FIG. 5 is a sectional view of the drum bottom of FIG. 2 taken along the lines V—V.

FIG. 5 shows the corresponding connection for a bottom 8 which has upwardly directed projections 10 with sections 9 which fit into notches in the circumferential side wall of fibre shell 2.

Figure 6:
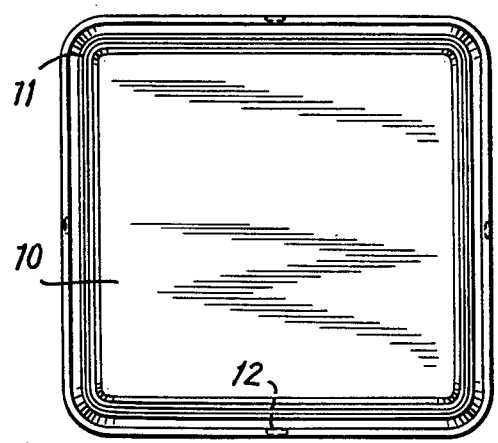
FIG. 6 is an elevational view of a rectangular cover/bottom according to the present invention.
Figure 7:
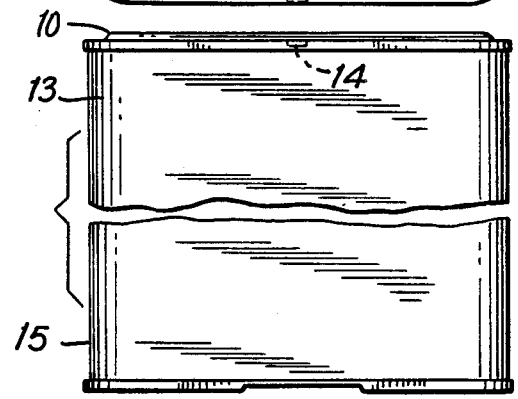
FIG. 7 is an elevational view of a rectangular drum which can be used with the cover of FIG. 6.

FIGS. 6 and 7 show an arrangement similar to that of FIGS. 1–5 except that the fibre shell 13 being used is a rectangular rather than circular cross section. As shown therein the fibre shell 13 has a peripheral side wall 15 with notches 14 into which downward projections 12 from cover 10, which has a 360° channel 11, project.

Figure 8:
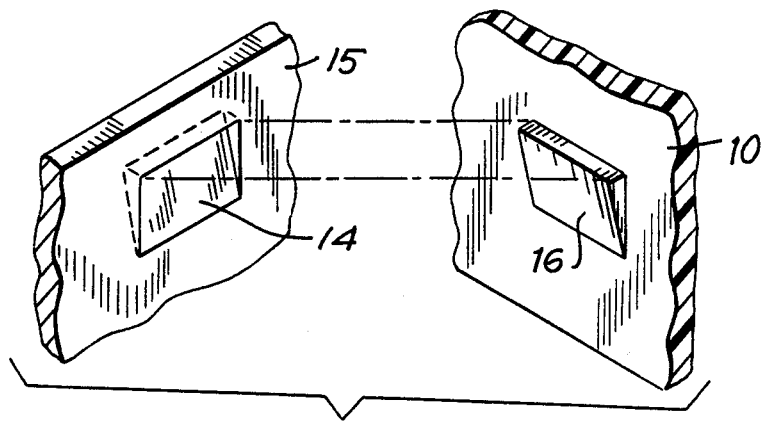
FIG. 8 is an exploded view showing how the projection of the cover/bottom fits into apertures into the fibre drum side wall to produce a locking tab arrangement.

FIG. 8 is an exploded view of how the sections of the projections from the cover/bottom fit into the side wall of the fibre shell. Using the same reference numerals for like elements as were used for FIGS. 6 and 7, a section 16 of downward projection 12 of cover 10 fits into a notch 14 of the peripheral side wall 15 of fibre shell 13. Again using the same reference numerals for like elements as were used with respect to FIGS. 6 and 7, FIG. 9 shows a front elevational view of notch 14 in peripheral wall 15 and FIGS. 10 and 11 respectively show the upward projection 10 from the bottom withdrawn from notch 14 in side wall 15 and inserted in notch 14 by means of its moveable section 16. As shown by FIG. 8, notched portions 14 bends inwardly upon engagement with projections 16.

FIG. 12 discloses a front elevational view of a portion of an embodiment of the present invention wherein a downward facing recess 17 exists in a bottom 18 to allow a tine of a fork lift truck to be inserted thereinto. This embodiment of the present invention is particularly advantageous when rectangular drums are used since they can be then loaded in groups of four (two to a fork lift tine) or even 6 if the tines are long enough.

In order to open a sealed drum a user can use a pair of cutters such as are used for cutting wire in such a way that they will sever a cut through portions of the outer periphery of the cover at the location of the locking device. This will make it possible for that section of the cover to swing outwardly, thereby releasing the locking feature and allowing the ultimate user to take off the cover and empty the contents from the drum.

Although preferred embodiments of the invention have been shown herein, many variations within the scope of the appended claims will occur to those skilled in the art.

What is claimed is:

1. The combination of a fibre drum and a self locking cover/bottom wherein the fibre drum includes a tubular drum side wall and opposed ends, the side wall having surfaces defining a plurality of spaced notches adjacent at least one of the ends, said notches being so constructed and arranged to have a free end facing the adjacent end and being movable radially inwardly into the interior of the side wall, and the cover/bottom comprising a planar surface and a peripherally extending depending projection in association with the exterior surfaces of the adjacent end of the side wall of the fibre drum and having a plurality of spaced tapered portions in registry with the notches, each tapered portion extending inwardly and towards the planar surface to engage, when in registry therewith, surfaces of the side wall defining the free end of a notch in the side wall, with the tapered portion projecting into the surfaces defining the associated notch to reinforce the fibre side walls of the notch and render it relatively impossible for the side wall to move away from the tapered portion of the projection of the cover/bottom.

2. The combination of claim 1 further comprising a channel extending around the periphery of said cover/bottom whereby said channel can be filled with a suitable adhesive such as a hot melt adhesive, and allowed to "set up" when the adjacent end of the side wall is locked in place so as to provide an additional seal.

3. The combination of claim 1 further comprising a channel extending transversely across said planar surface to facilitate lifting by a fork lift truck.

4. The combination of claim 1 wherein said notches have a fixed end in said side wall and the free ends are bendable radially upwardly movable.

5. The combination of claim 1 wherein said tapered portion is movable.

6. The combination of claim 1 wherein the cover/bottom is formed of plastic material.

* * * * *